United States Patent [19]

Friedman et al.

[11] Patent Number: 5,340,558
[45] Date of Patent: Aug. 23, 1994

[54] VERMICULITE COMPOSITION WITH IMPROVED THERMAL EXPANSION PROPERTIES

[75] Inventors: Semyon D. Friedman, Baltimore, Md.; Robert W. McKinney, Palm Coast, Fla.; Chia-Chih Ou, Lexington, Mass.; Robert M. Spotnitz, Baltimore; Shaohai Wu, Ellicott City, both of Md.

[73] Assignee: W.R. Grace & Co.-Conn., New York, N.Y.

[21] Appl. No.: 76,663

[22] Filed: Jun. 14, 1993

[51] Int. Cl.$^5$ .............................. C04B 14/20
[52] U.S. Cl. .................. 423/328.1; 252/378 R; 252/606; 106/675; 106/DIG. 3; 209/4; 241/4; 241/68; 428/920
[58] Field of Search .............. 252/378 R, 606; 423/328.1; 106/675, DIG. 3; 428/920, 313.7; 241/4, 68; 209/4

[56] References Cited

U.S. PATENT DOCUMENTS

| | | | |
|---|---|---|---|
| 2,030,239 | 2/1936 | Byers | 252/378 R |
| 2,139,358 | 12/1938 | Ericson | 252/378 R |
| 3,076,546 | 2/1963 | Ziegler et al. | 252/378 R |
| 4,130,687 | 12/1978 | Ballard et al. | 252/378 R |
| 5,116,537 | 5/1992 | Yang et al. | 252/378 R |

FOREIGN PATENT DOCUMENTS

| | | | |
|---|---|---|---|
| 591118 | 1/1960 | Canada | 252/378 R |
| 771593 | 11/1967 | Canada | 252/378 R |

*Primary Examiner*—Anthony Green
*Attorney, Agent, or Firm*—Howard J. Troffkin

[57] ABSTRACT

A vermiculite composition capable of exhibiting a high degree of volume increase upon subjection to thermal exfoliation composed of vermiculite mineralogical species having specific gravity of from 2.5 g/cm$^3$ to 2.9 g/cm$^3$. Further, intumescent sheets formed with said vermiculite composition exhibit low initial expansion temperature and very high maximum expansion properties.

15 Claims, No Drawings

VERMICULITE COMPOSITION WITH IMPROVED THERMAL EXPANSION PROPERTIES

BACKGROUND OF INVENTION

The invention described herein relates to vermiculite compositions having enhanced volume increase upon thermal exfoliation and to products formed therewith. Specifically, the vermiculite composition is composed of particulate vermiculite having a specific gravity of from 2.5 g/cm$^3$ to 2.9 g/cm$^3$. The subject composition can be formed into sheet products, utilized as a component in cement compositions or be thermally exfoliated to provide an exceptionally high yield material.

Vermiculite ore is composed of micaceous minerals, chemically identified as a hydrated magnesium-aluminum-iron silicates and characterized by a platelet structure which exfoliate or expand in a single direction when subjected to high temperatures treatment. The vermiculite increases several times its original size and traps within itself thousands of minutely sized air cells. The minerals occur naturally in an unexpanded state, and are mined in conventional manner.

The vermiculite ore, as mined, is associated with other minerals and undesirables. The crude vermiculite ore normally contains about 15 to 30 weight percent commercially desired vermiculite material. This crude ore is beneficiated by various known surface chemistry techniques to separate the gangue from the expandable material. For example, the crude ore is normally washed with water to remove clays and other associated fines. The remaining material is subjected to screening (with optional prior crushing to reduce particle size) to separate sand, rock and other debris from the platelet materials which contain non-expandable minerals (mica, etc.) and expandable materials. These are separated by treating the material with a surfactant and subjecting it to flotation or wet concentrating table techniques to recover vermiculite ore concentrate. Ore concentrate is generally composed of 85 to 99 weight percent expandable vermiculite ore having a range of specific densities depending on its platelet configuration.

The naturally occurring ore and the ore concentrate are composed of a mixture of vermiculite mineralogical species having a broad spectrum of densities ranging from less than 1.9 g/cm$^3$ to over 3.0 g/cm$^3$.

Vermiculite minerals are well known for their capacity to undergo expansion to several times original volume when subjected to elevated temperatures. The process of expanding vermiculite ore concentrate by heating is referred to as thermal exfoliation. This process is conventionally achieved by a continuous procedure in which vermiculite concentrate are fed into an expansion kiln or oven, heated rapidly to temperatures in the range of 1100° F. to 1900° F., and the resultant expanded vermiculite product removed from the heating zone as additional unexpanded material is introduced.

It is common in the art of thermal exfoliation of vermiculite to refer to the "yield" obtained by exfoliation. This yield is the volume of expanded vermiculite, when loosely accumulated without compression of the expanded particles, obtained from an initial weight of unexpanded material. Since expanded vermiculite is generally sold on a volume basis, it proves economically advantageous to the producer to maximize the yield.

The expanded vermiculite has a wide variety of well known uses, including use as an aggregate in plaster and concrete formulations, a thermal insulator, an extender in fertilizers and soil mixes, an inert carrier for chemicals, such as insecticides herbecides, nutrients and the like, a packaging material, and as roughage or filler in animal feed.

Various methods have been proposed to increase the yield on thermal exfoliation. U.S. Pat. No. 3,062,753 to Hayes teaches that yield may be increased by subjecting the ore to ion exchange pre-treatment. U.S. Pat. No. 3,686,134 to Robinson teaches a method requiring pre-heating the ore concentrate at low temperatures under a saturated moisture atmosphere prior to subjecting the concentrate to thermal exfoliation. Canadian 1,241,153 to Hindman teaches that by applying vegetable oil to the vermiculite ore concentrate one achieves higher yields upon thermal exfoliation. Because of the elaborate demands of these processes, they are not economically effective with respect to the product (e.g. packing, feed, filter, etc.) achieved.

Vermiculite ore concentrates have also been used to form flexible intumescent sheet products, as described in U.S. Pat. Nos. 3,916,057; 4,305,992; and 4,385,135, which teachings are incorporated herein by reference. The intumescent sheet may be used to mount ceramic cores in catalytic converters. In such application, the intumescent sheet expands in situ upon initial subjection to the hot exhaust gases to hold the ceramic core in place within the canister body. Such sheet products are generally formed from conventional vermiculite ore concentrate and, thus, have varying thermal-mechanical properties depending on the natural ore's composition. In certain instances, the concentrate is treated to ion exchange treatment to enhance the properties of the concentrate. It is highly desired to provide an intumescent sheet product having low initial expansion temperature and a very high maximum expansion to provide a sheet of uniform thermal-mechanical characteristics.

It is highly desired and an object of the present invention to provide a vermiculite composition which is capable of exhibiting enhanced yields upon heating at elevated temperature.

It is highly desired and an object of the present invention to provide an economical process for forming a vermiculite composition capable of exhibiting high yields.

It is highly desired and an object of the present invention to produce shaped products, such as sheets and the like from a vermiculite composition, which can exhibit enhanced expansions and desirable thermal-mechanical properties upon subjection to elevated temperatures.

SUMMARY OF THE INVENTION

The subject invention described and claimed herein is directed to a vermiculite composition, and articles formed therewith, which is composed of vermiculite ore concentrate which has a specific density of from 2.5 g/cm$^3$ to 2.9 g/cm$^3$.

DETAILED DESCRIPTION

The present invention is directed to a vermiculite composition capable of exhibiting a very high yield upon subjection to elevated temperature. The present composition can be used to form improved articles, such as intumescent sheet products and the like.

The crude vermiculite ore is normally mined by open pit mining. In the mining process, the ore is collected in combination with other minerals, common dirt and the like. This crude material is beneficiated by known methods to remove gangue material. The separated vermiculite ore concentrate is made up of a number of mineral species having a spectrum of specific densities. Normally, the recovered vermiculite ore concentrate is composed of materials having a density ranging from about 1.9 to over 3.0 $g/cm^3$.

It has been unexpectedly found that a vermiculite composition composed of vermiculite mineral species having a specific density of from 2.5 to 2.9 $g/cm^3$ and substantially free of gangue material has enhanced expansion characteristics when subjected to thermal expansion.

The crude vermiculite ore is beneficiated in conventional manners, as described above and well known to those skilled in this art. Such beneficiating procedures use surface chemistry phenomena to separate the expandable vermiculite minerals from the non-expandable material collected with it during mining. Beneficiating produces an ore concentrate which is conventionally composed of about 85 weight percent or more of a variety of expandable vermiculite minerals.

The present vermiculite composition is composed of vermiculite mineral species having a specific density of from 2.5 $g/cm^3$ to 2.9 $g/cm^3$. Such mineral species normally make up about 50 weight percent of conventional ore concentrate. The remainder being composed of mineral species having specific density of less than 2.5 $g/cm^3$, mineral species having specific density of greater than 2.9 $g/cm^3$ as well as residual non-expandable minerals and gangue material. To form the vermiculite composition of the present invention, conventional vermiculite ore concentrate must be further treated to remove substantially all or at least a major portion of materials having a specific density of less than 2.5 $g/cm^3$ and greater than 2.9 $g/cm^3$.

The vermiculite composition of the present invention is composed of vermiculite ore concentrate composed of vermiculite mineral species having specific density of 2.5 $g/cm^3$ to 2.9 $g/cm^3$ and more preferably from 2.6 $g/cm^3$ to 2.8 $g/cm^3$. Further, the vermiculite composition should be composed of at least 90%, preferably 95% by weight of material having density of 2.5 to 2.9 $g/cm^3$ and of which vermiculite mineral species preferably makes up at least 90% and most preferably at least 95% by weight of the material.

As more fully described herein below, conventional vermiculite ore concentrate must be further purified to remove a substantial portion of the vermiculite mineral species and gangue material contained in the concentrate to attain the present vermiculite composition. It has been found that the vermiculite composition of the present invention has the unexpected ability to expand to a greater degree than conventional vermiculite ore concentrate and to provide an improved intumescent sheet product. This ability to expand is normally at least about 20 percent and, in most instances, at least about 50 percent greater than conventional ore concentrate. Further, the present vermiculite composition is unexpectedly capable of forming intumescent sheet products having low initial expansion temperature and very high maximum expansion properties which are highly desired in such products.

The subject vermiculite composition can be prepared from vermiculite ore concentrate by density classification techniques. For example, removal of all low density material can be done by mixing the ore concentrate with a liquid media having a desired low density cut-off value, such as a density of 2.5 $g/cm^3$ (preferably 2.6 $g/cm^3$). All of the material which floats is removed from the resultant slurry. The remaining solids are removed and collected from the liquid media by filtration or the like. The collected solids are then made into a second slurry with a fluid or liquid media having a desired high density cut-off value, such as a density of 2.9 $g/cm^3$ (preferably 2.8 $g/cm^3$) to remove the particulate material from the vermiculite minerals having higher density than required to provide a composition of the present invention. Here, the material which floats on the liquid media is collected.

The appropriate density classification liquid can be formed from a single liquid having the appropriate density or from a mixture of miscible liquids of different specific densities. For example, tribromoethanediol has a density ($g/cm^3$) of 2.57; tribromomethane has a density of 2.9; dibromomethane has a density of 2.5; or mixtures of liquids composed of perchloroethylene (1.2); naphtha (1.6); toluene (1.6); methylene bromide (2.1); tetrachloroethane (2.1); dibromoethane (2.6); tetrabromoethane (2.95); and tetrabromomethane (3.42) and the like can be formed in ratios to provide the desired specific density.

The density separation can also be conducted by heavy media separation using colloidal suspensions of finely divided, heavy particles in water as a pseudofluid. Various solid particles have been used to form heavy media colloidal suspensions including quartz, barite, loess, gypsum and pyrite, magnetite, galena, ferrosilicons and the like. Ferrosilicons are preferred materials because of their ability to make sharp separations at varying densities, as required by the present invention, by varying the ratio of water to ferrosilicon; the ability to readily remove the sink product continuously; and low cost of material and operation. Heavy media separation techniques are discussed in Society of Mining Engineers Mineral Processing Handbook, Vol. 1, Section 4, Chapter 2, (1985) Editor-in-Chief, N. L. Weiss.

Still another method of separating out the desired material is to first wash the ore concentrate free of any surfactant material which may have been added during conventional beneficiation. The washed material is then processed to provide a substantially uniform particle size material which can then be separated into density fractions using a shaking table sorting apparatus.

The undesired material from each densification step can be collected and used as low-end material, such as filler, feed additive, etc. where expansion characteristics are not critical.

The present vermiculite composition exhibits substantially uniform expansion and thermal-mechanical properties irregardless of the vermiculite ore source. Thus, the composition provides uniformity which conventional ore concentrates obtained from different sources do not exhibit.

The present vermiculite composition may be treated by known processes to further modify the vermiculite. For example, the composition can be ion exchanged by treating with an ammonium or potassium salt to substitute for the magnesium cation naturally found in the vermiculite platelet structure.

The unexpanded vermiculite composition of the present invention provides a high grade material capable of exhibiting desired high expansion properties. The composition can be used to form intumescent sheets which can be used as a liner and mounting material in automobile exhaust catalytic converters. The unexpanded vermiculite composition may be used to form a fire retardant mastic coating, as described in U.S. Pat. No. 3,090,764; as part of an asphaltic composition and roofing materials, as disclosed in U.S. Pat. Nos. 3,556,819 and 3,365,322 to provide insulation and fire stop protection when exposed to a fire.

Sheet material can be formed by combining unexpanded vermiculite with inorganic fibrous material and binder. The sheet can have any desired thickness and is usually from 0.5 to 5 mm thick. The sheet material may be formed by standard papermaking techniques, either hand laid or machine laid, taking suitable precautions to attain substantially uniform distribution of particles throughout the web. The sheet material may be provided with or temporarily laminated to a backing sheet of kraft paper, plastic film, non-woven synthetic fiber web or the like as desired. From about 40% to about 65% by weight of intumescent material, unexpanded vermiculite composition described herein and having particle sizes of from about 0.1 up to about 6 mm. and preferably up to about 2 mm are combined with from about 25% to about 50% by weight of inorganic fibrous materials, such as soft glass fibers, refractory filaments, including zirconia-silica fibers, crystalline alumina whiskers and alumino-silicate fibers and the like, and from about 5% to about 15% of binder such as an organic polymeric material, such as acrylate and methacrylate polymers, natural rubbers, styrene-butadiene latex butadiene-acrylonitrile latex and the like. These materials are mixed together in the presence of a large volume of water. Small amounts of surfactants, foaming agents and flocculating agents may also be added before forming the sheet.

Flocculation is conveniently achieved using electrolytes such as aluminum. Small amounts of organic fibrous materials may be added to impart additional green strength to the green sheet material.

The materials are blended together in a large volume of water, of the order of 5 to 100 times as much by weight and the flocculating agent or agents are added. A small amount of surfactant or foaming agent may also be employed in order to improve the dispersion of the materials.

The sheet is conveniently formed by standard papermaking techniques either in a hand-sheet former of Fourdrinier screen. The resulting green sheet is compressed to give a dry weight density of about 0.35 g./ml. or more, dried at about 90° C. to form a handleable, readily flexible, resilient, intumescent sheet material.

The subject vermiculite composition can be also utilized in its expanded form. The material is treated to conventional thermal exfoliation. Such material has enhanced void volume and, thereby, provides a high end material capable of carrying larger volumes of fertilizer which is intercalated within the exfoliated material. Such material can enhance the thermal insulation characteristics of gypsum cement compositions, as described in U.S. Pat. Nos. 3,719,573 and 3,839,059, to which it is added.

The following examples are given for illustrative purposes only and are not meant to be a limitation on the claimed invention. All parts and percentages are by weight unless otherwise stated.

EXAMPLE I

A vermiculite ore concentrate obtained by conventional beneficiation was classified by specific density using heavy liquid separation. The vermiculite was mixed with a heavy liquid. Some of the vermiculite floated while the rest sank. The fraction that sank was denser than the liquid while the fraction that floated was less dense. The sink fraction was recovered and further separated using a denser liquid. Liquid mixtures of methylene bromide (2.10 g/cm$^3$), dibromoethane (2.6) and tetrabromoethane (2.95) were used to prepare solutions with specific gravities in the range of 2.3 to 2.9. Using these solutions, the vermiculite ore concentrate was classified into eight fractions. Combined material having density of from 2.5 g/cm$^3$ to 2.9 g/cm$^3$ was 68.7 weight percent of the total vermiculite ore concentrate used. 47.6 weight percent of the total vermiculite concentrate had a specific density of 2.6 to 2.8 g/cm$^3$ specific density.

Table 1 correlates the specific density of each fraction with the free expansion. Relative expansion is defined as the ratio of the volume of the vermiculite after treatment at 400° C. for ten minutes to the initial volume.

TABLE I

| Concentrate Fraction, g/cm$^3$ | Relative Free Expansion |
| --- | --- |
| <2.3 | 1.17 |
| 2.3 to 2.4 | 1.31 |
| 2.4 to 2.5 | 1.48 |
| 2.5 to 2.6 | 2.21 |
| 2.6 to 2.7 | 2.50 |
| 2.7 to 2.8 | 2.89 |
| 2.8 to 2.9 | 2.44 |
| >2.9 | 1.06 |

The Relative Free Expansion of the combined material obtained with specific density of less than 2.5 g/cm$^3$ was about 1.3 while the Relative Free Expansion of a vermiculite composition composed of material of 2.5 to 2.9 g/cm$^3$ specific density was about 2.5. Thus, the present vermiculite composition exhibits an ability to expand approximately twice as much as the other material.

EXAMPLE 2

Intumescent sheet materials were prepared using a paper making process. 15.4 parts of ceramic fibers (washed Fiberfrax of Carborundum Co.) were added to 1000 parts water in a high speed mixer. The resultant mixture was transferred to a low speed mixer and 8 parts of a 40 percent butadiene-acrylonitrile latex solution (Hycard 1562×103) and 28 parts of an unexpanded vermiculite composition indicated below were added while mixing. 1.5 parts of a 10 percent alum solution was then added. The resultant slurry was poured into a hand sheet paper former (Valley Iron Works) which contained additional water. The water was drawn off and the resultant sheet pressed at 200 lbs pressure and dried.

From each formed sheet, two samples, each of 0.5 inch diameter, were cut and carefully stacked and placed in a Thermal Mechanical Analyzer (Theta Industries, Port Washington, N.Y.). A 9.8 lb. weight was applied to the sample being tested to give an effective load of 50 psi. After seven minutes under load, the thickness of the sample was noted and the sample heated at a program rate of 20° C./min. The thickness versus temperature was monitored by recording the data at 10 sec. intervals.

The temperature at which expansion began and the maximum percent thermal expansion (given relative to initial thickness) under load were recorded and are given in Table II below:

TABLE II

| Concentrate Fraction, g/cm$^3$ | Initial Expansion Temperature, °C. | Maximum Relative Expansion |
|---|---|---|
| 2.5–2.6 | 357 | 1.57 |
| 2.6–2.7 | 348 | 1.52 |
| 2.7–2.8 | 300 | 1.55 |
| 2.5–2.9 | 334 | 1.55 |
| <2.3 (comp.) | 358 | 1.22 |
| 2.3–2.4 (comp.) | 385 | 1.24 |
| 2.4–2.5 (comp.) | 385 | 1.24 |

It is clear that the comparison ("comp.") material having a specific density of less than 2.5 g/cm$^3$ exhibited poorer (higher) initial expansion temperature and poorer (lower) Maximum Relative Expansion in comparison to the present vermiculite composition having density of 2.5 to 2.9 g/cm$^3$.

What is claimed:

1. A vermiculite composition having the capability of exhibiting enhanced volume increase upon subjection to thermal exfoliation consisting essentially of a vermiculite ore concentrate material having at least 90% of at least one unexpanded vermiculite mineralogical specie or mixtures thereof having a specific density in the range of from 2.5 g/cm$^3$ to 2.9 g/cm$^3$.

2. The vermiculite composition of claim 1 wherein the specific density is in the range of from 2.6 g/cm$^3$ to 2.8 g/cm$^3$.

3. The vermiculite composition of claim 1 wherein the composition is composed of at least 95% by weight of said vermiculite mineralogical species.

4. The vermiculite composition of claim 2 wherein the composition is composed of at least 95% by weight of said vermiculite mineralogical species.

5. The vermiculite composition of claim 1 which is treated by cation exchange with potassium cations.

6. A process of forming a vermiculite composition capable of exhibiting enhanced volume increase upon subjection to thermal exfoliation comprising:
   i. beneficiating vermiculite ore to form vermiculite ore concentrate having a substantial portion of gangue material removed therefrom;
   ii. treating the ore concentrate to density classification to separate out a vermiculite ore concentrate composition composed of at least 90 weight percent of vermiculite mineralogical species having specific density in the range of from 2.5 g/cm$^3$ to 2.9 g/cm$^3$; and
   iii. recovering the vermiculite composition.

7. The process of claim 6 wherein the ore concentrate is treated to density classification to provide a vermiculite composition having at least 90 weight percent of at least one vermiculite mineralogical species or mixtures thereof having a density of 2.6 g/cm$^3$ to 2.8 g/cm$^3$.

8. The process of claim 6 wherein the recovered vermiculite composition is composed of at least 95% by weight of said vermiculite mineralogical species.

9. The process of claim 7 wherein the recovered vermiculite composition is composed of at least 95% by weight of said vermiculite mineralogical species.

10. The process of claim 6 wherein the density classification comprises mixing a vermiculite ore concentrate with a low density fluid media having a specific density substantially equal to 2.5 g/cm$^3$, separating and recovering vermiculite material having a higher density than 2.5 g/cm$^3$ from the low-density fluid media, further mixing the recovered material with a high density fluid media having a specific density substantially equal to 2.9 g/cm$^3$ and separating and recovering material having a lower density than 2.9 g/cm$^3$ from the high-density fluid media.

11. The process of claim 7 wherein the density classification comprises mixing a vermiculite ore concentrate with a low density fluid media having a specific density substantially equal to 2.6 g/cm$^3$ separating and recovering vermiculite material having a higher density than 2.6 g/cm$^3$ from the low-density fluid media, further mixing the recovered material with a high density fluid media having a specific density substantially equal to 2.8 g/cm$^3$ and separating and recovering material having a lower density than 2.8 g/cm$^3$ from the high-density fluid media.

12. A flexible intumescent sheet product comprising from about 25% to 50% by weight of inorganic fibrous material, from about 5% to 15% of a binder and from about 40% to 65% by weight of at least one vermiculite mineralogical species having a specific density of from 2.5 g/cm$^3$ to 2.9 g/cm$^3$.

13. The sheet product of claim 12 wherein the vermiculite mineralogical species have a specific density of from 2.6 g/cm$^3$ to 2.8 g/cm$^3$.

14. The sheet product of claim 12 wherein the vermiculite mineralogical species is treated to cationic exchange with ammonium or potassium cations.

15. The sheet product of claim 13 wherein the vermiculite mineralogical species of said vermiculite composition is treated to cationic exchange with ammonium or potassium cations.

* * * * *

UNITED STATES PATENT AND TRADEMARK OFFICE
CERTIFICATE OF CORRECTION

PATENT NO. : 5,340,558
DATED : August 23, 1994
INVENTOR(S) : Semyon D. Friedman; Robert W. McKinney; Chia-Chih Ou; Robert M. Spotnitz; Shao-hai Wu It is certified that error appears in the above-indentified patent and that said Letters Patent is hereby corrected as shown below:

Column 8, line 51, delete "of said vermiculite composition".

Signed and Sealed this

Twenty-fifth Day of October, 1994

Attest:

BRUCE LEHMAN

*Attesting Officer*     *Commissioner of Patents and Trademarks*